United States Patent [19]

Oishi

[11] Patent Number: 5,379,095
[45] Date of Patent: Jan. 3, 1995

[54] IMAGE READING APPARATUS WITH THE OPTICAL READING UNITS AND PHOTOELECTRIC CONVERSION DEVICE MOUNTED ON A COMMON GUIDE MEMBER

[75] Inventor: Nozomu Oishi, Chigasaki, Japan

[73] Assignee: Matsushita Graphic Communication Systems, Inc., Tokyo, Japan

[21] Appl. No.: 900,374

[22] Filed: Jun. 18, 1992

[30] Foreign Application Priority Data

Jun. 18, 1991 [JP] Japan .................................. 3-145877
Jul. 17, 1991 [JP] Japan .................................. 3-176640

[51] Int. Cl.6 ........................................... G03G 15/28
[52] U.S. Cl. ........................................ 355/233; 355/235
[58] Field of Search .............. 355/233, 208, 234, 235, 355/232, 320, 230, 231, 236; 271/3, 3.1, 4, 8.1, 9, 225

[56] References Cited

U.S. PATENT DOCUMENTS

| | | | |
|---|---|---|---|
| 4,403,877 | 9/1983 | Jones et al. | 355/236 X |
| 4,589,761 | 5/1986 | Landa | 355/236 X |
| 4,616,269 | 10/1986 | Nori | 358/293 |
| 4,710,017 | 12/1987 | Watanabe et al. | 355/235 |
| 5,029,315 | 7/1991 | Morikawa et al. | 355/235 |
| 5,030,993 | 7/1991 | Miyasaka et al. | 355/234 |
| 5,055,880 | 10/1991 | Fujiwara | 355/235 |
| 5,075,539 | 12/1991 | Shiraishi | 250/208.1 |
| 5,079,588 | 1/1992 | Ohira et al. | 355/235 |
| 5,084,732 | 1/1992 | Tsaur et al. | 355/230 |
| 5,105,225 | 4/1992 | Honjo et al. | 355/233 |
| 5,113,225 | 5/1992 | Deguchi | 355/235 |

FOREIGN PATENT DOCUMENTS

| | | | |
|---|---|---|---|
| 0028730 | 2/1987 | Japan | 355/326 |
| 0089834 | 4/1988 | Japan | 355/236 |
| 0097975 | 4/1990 | Japan | 355/236 |

*Primary Examiner*—Leo P. Picard
*Assistant Examiner*—Christopher Horgan
*Attorney, Agent, or Firm*—Lowe, Price, LeBlanc & Becker

[57] ABSTRACT

An image reading apparatus includes a photoelectric conversion unit which is held, together with a first movable optical reading unit and a second movable optical reading unit, on a guide member instead of a chassis. Since all of the first movable optical reading unit, second movable optical reading unit and photoelectric conversion unit are held on the common guide member, the positional relationship between the photoelectric conversion unit and the guide member is held always constant even when a chassis is deformed due to an environmental change or an external force. This arrangement insures a high image quality reading. The image reading apparatus also includes a transparent plate disposed on an upper surface of an original holding glass plate so as to cover a moving original reading position defined at that glass plate portion. An exit guide have a front end which is disposed adjacent to a downstream end of the transparent plate and held at a level below an upper surface of the transparent plate. With this arrangement, a moving original sheet can smoothly move from the transparent plate to the exit guide without being caught by the front end of the exit guide.

8 Claims, 6 Drawing Sheets

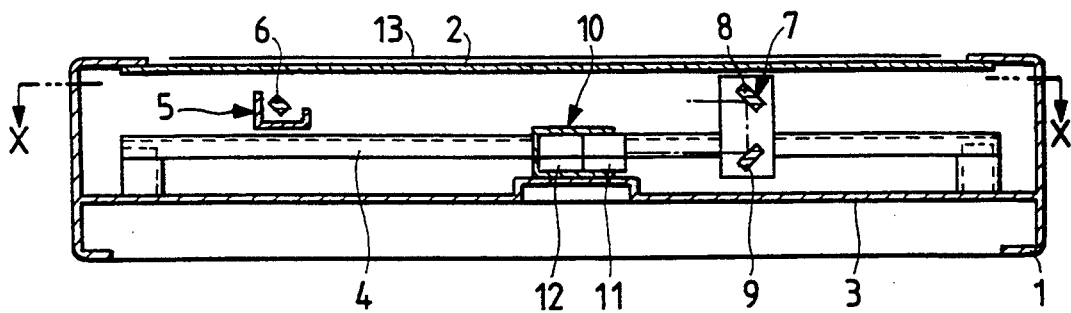
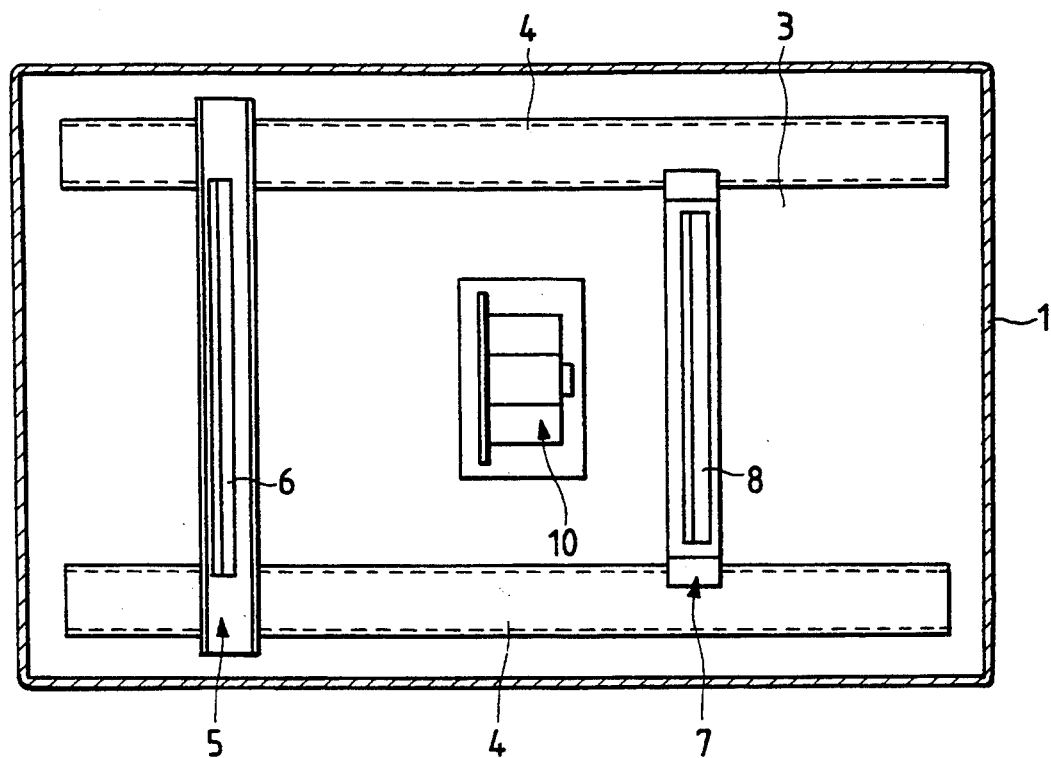

IMAGE READING APPARATUS WITH THE OPTICAL READING UNITS AND PHOTOELECTRIC CONVERSION DEVICE MOUNTED ON A COMMON GUIDE MEMBER

BACKGROUND OF THE INVENTION

1. Field of the Invention

The present invention relates generally to image reading apparatus such as image scanners, and more particularly to an image reading apparatus of the so-called "flat bed" type which is capable of reading a stationary original sheet and a moving original sheet by scanning the original sheet with a movable optical unit including a light source and a mirror and by reading scanned information on the original sheet as two-dimensional information by a fixed photoelectric conversion unit.

2. Description of the Prior Art

A conventional image reading apparatus of the type concerned includes, as shown in FIGS. 9 and 10, a housing or case 1, an original holding plate 2 made of transparent glass, a chassis 3 attached horizontally to the case 1, a pair of parallel spaced guide members 4 attached to the chassis 3 and extending in a plane parallel to the original holding plate 2, a first movable optical reading unit 5 movably mounted on the guide members 4 and having a light source (not shown) and a mirror 6, a second movable optical reading unit 7 movably mounted on the guide members 4 and having two mirrors 8 and 9, a photoelectric conversion unit 10 fixedly mounted on the chassis 3 and having a lens 11 and an image sensor 12, and a drive mechanism (not shown) for moving the first and second optical reading units 5 and 7 along the guide members 4. In general, the chassis 3 is molded of a synthetic resin such as acrylonitrile-butadiene-styrene (ABS) resin, and the guide members 4 are elongate metal plates.

The image reading apparatus is so constructed as to deal with both a stationary original sheet which is manually placed on the original holding plate 2, and a moving original sheet which is automatically supplied onto the original holding plate 2 by an automatic document feeder described later on. To this end, as shown in FIG. 11, the original holding plate 2 is composed of a first flat bed glass 2a for holding thereon a stationary original sheet 13 (FIG. 9) to be read, and a second flat bed glass 2b for guiding therealong a moving original sheet 13 as it passes through a moving original reading position located on the second flat bed glass 2b. The first movable optical reading unit 5 incorporating therein the light source 14 and the mirror 6 is locatable directly below the moving original reading position. The first and second flat bed glasses 2a and 2b are attached to the case 1 by a pair of bed glass support members 15 and 16 so that the first and second flat bed glasses 2a and 2b are flush with each other or extend in the same plane.

An automatic document feeder 17 which is an optional part of the image reading apparatus is disposed above the original holding plate 2 for automatically feeding original sheets 13 one after another through the moving document reading position. The automatic document feeder 17 includes an original conveyor roller system 18 composed of a plurality of mating roller pairs for feeding the original sheet 13 onto said second flat bed glass 2b and subsequently discharging the original sheet 13 downstream from said second flat bed glass 2b, a pair of confronting entrance guide members 19 and 20 for guiding the original sheet 13 over and across the second flat bed glass 2b while the original sheet 13 is being conveyed by the original conveyor roller system 18, and an exit guide 21 for guiding the original sheet 13 as the original sheet 13 is discharged from the moving document reading position on the second flat bed glass 2b to the outside of the automatic document feeder 17.

When the image reading apparatus is used with a stationary original sheet as a stationary original exposure type image reading apparatus, an original sheet 13 is placed on the first flat bed glass 2a (FIG. 11) of the original holding plate 2, as shown in FIG. 9. Then, the original sheet 13 is irradiated with the light source 14 (FIG. 11), and light reflected from the original sheet 13 is guided by the mirrors 6, 8 and 9 into the photoelectric conversion unit 10. The first optical reading unit 5 is moved along the entire surface of the original sheet 13 and, in synchronism with the movement with the first optical reading unit 5, the second optical reading unit 7 is moved so that the entire surface of the original sheet is scanned and thus information is read from the original sheet.

When the components of the image reading apparatus are thermally deformed due to a change in environmental conditions (temperature change, for example), the amount of thermal deformation of the chassis 3 is greater than that of the guide members 4 because, as described above, the chassis 3 is molded of a synthetic resin and the guide members 4 are made of metal. Due to the difference in thermal deformation, the chassis 3 tends to deform or bend, thus displacing the photoelectric converting unit 10 held thereon relative to the guide members 4. As a result, an optical axis which is defined by the mirrors 6, 8 and 9 of the first and second optical reading units 5 and 7 held on the guide members 4 is displaced out of alignment with an optical axis of the photoelectric conversion unit 10, so that the quality of an image read on the image reading apparatus is deteriorated.

Furthermore, when the chassis 3 is twisted or otherwise deformed by an external force or pressure, the photoelectric conversion unit 10 is displaced relative to the guide members 4 on which the first and second optical reading units 5 and 7 are held. Thus, the above-mentioned misaligned optical axes problem occurs again.

When the image reading apparatus is used with a moving original sheet as a moving original exposure type image reading apparatus, a leading one 13 of original sheets set on the automatic document feeder 17 is supplied by the original conveyor roller system 18 and then guided by the entrance guide members 19 and 20 so that the original sheet 13 passes through the moving original reading position on the second flat bed glass 2b in a sub-scanning direction, as shown in FIG. 11. During that time, the light source 14 of the first optical reading unit 5 held at a position directly below the second flat bed glass 2b irradiates the moving original sheet 13. Light reflected from the moving original sheet 13 is directed by the mirror 6 in a direction parallel to the original holding plate 2 as indicated by the arrow 22 and then it is further directed by the mirrors 8 and 9 (FIG. 9) toward the photoelectric conversion unit 10 (FIG. 10) so that information is read from the original sheet 13. The original sheet 13 is subsequently guided by the exit guide 21 and discharged to the outside of the automatic document feeder 17.

In the moving original reading operation described above, it is important that the original sheet 13 after having been read above the second flat bed glass 2b is smoothly and stably guided by the exit guide 21 and then discharged to the outside of the automatic document feeder 17. To this end, the first flat bed glass 2a and the second flat bed glass 2b are separated by a space so that this space can be used for setting a front end (upstream end) of the exit guide 21 at a level below an upper surface of the second flat bed glass 2b. Instead of using two flat bed glasses 2a and 2b, a single flat bed glass 2c may be used as shown in FIG. 12 in which instance, however, the upper surface of the flat bed glass 2c must be recessed at a portion immediately downstream of the moving original reading position. A guide member 23 is disposed in the recess for guiding the original sheet 13 toward the outside of the automatic document feeder 17 after the original sheet 13 moves past the moving document reading position on the flat bed glass 2c.

The image reading apparatus having two flat bed glasses 2a and 2b such as shown in FIG. 11 is costly to manufacture due to the use of two flat bed glasses 2a and 2b. In addition, in order to attach the two flat bed glasses 2a and 2b, the image reading apparatus requires additional bed glass support members 15, 16 which makes the case complicated in construction and increase the overall size of the image reading apparatus. The image reading apparatus having a single flat bed glass 2c such as shown in FIG. 12 is free from the foregoing problems caused by the use of two flat bed glasses 2a and 2b, however, due to the necessity of providing the recess, the flat bed glass 2c is costly to manufacture and eventually increases the overall production cost of the image reading apparatus.

SUMMARY OF THE INVENTION

It is, accordingly, a general object of the present invention to overcome the drawbacks associated with the conventional image reading apparatus.

A more specific object of the present invention is to provide an image reading apparatus incorporating structural features which are able to preclude the occurrence of a misalignment between an optical axis of mirrors in movable optical reading unit and an optical axis of a fixed photoelectric conversion unit even when a chassis is twisted or otherwise deformed due to thermal deformation or external forces, thereby insuring a high quality image reading.

Another object of the present invention is to provide an image reading apparatus which is capable of guiding a moving original sheet smoothly and stably in a downstream direction after it passes through a moving document reading position on a single flat bed glass.

In brief, an image reading apparatus of this invention includes a photoelectric conversion unit which is held, together with a first movable optical reading unit and a second movable optical reading unit, on a guide member instead of a chassis.

With this construction, since all of the first movable optical reading unit, second movable optical reading unit and photoelectric conversion unit are held on the common guide member, the positional relationship between the photoelectric conversion unit and the guide member is held always constant even when a chassis is deformed due to an environmental change or an external force. Thus, an optical axis defined by mirrors of the first and second movable optical reading units is held always in alignment with an optical axis of the photoelectric conversion unit. Even if the chassis is twisted due to an external force and hence the guide member is slightly twisted, a change in the position of the photoelectric conversion unit relative to the guide member is substantially negligible. Thus, the image reading apparatus of this invention is always able to perform a high quality image reading operation.

The image reading apparatus includes a single flat original holding glass plate so-called "flat bed glass" used commonly for a stationary original sheet and for a moving original sheet. A transparent plate is disposed on an upper surface of a portion of the original holding glass plate so as to cover a moving original reading position defined at that glass plate portion, and an exit guide have a front end (upstream end) which is disposed adjacent to a downstream end of the transparent plate and held at a level below an upper surface of the transparent plate.

Since the transparent plate is disposed on the upper surface of the flat original holding glass plate, the upper surface of the transparent plate is higher than the upper surface of the original holding glass plate. It is, therefore, possible to arrange the front end of the exit guide immediately adjacent to the transparent plate and at a level below the upper surface of the transparent plate. With the exit guide thus arranged, the moving original sheet is guided smoothly and stably by the exit guide without being caught by the front end of the exit guide. In addition, the original holding glass plate is devoid of a recess in its upper surface and hence can be manufactured easily at a low cost.

The above and other objects, features and advantages of the present invention will become more apparent from the following description when making reference to the detailed description and the accompanying sheets of drawings in which a preferred structural embodiment incorporating the principles of the present invention is shown by way of illustrative example.

BRIEF DESCRIPTION OF THE DRAWINGS

FIG. 9 is a schematic longitudinal cross-sectional view of a conventional image reading apparatus;

FIG. 10 is a cross-sectional view taken along line X—X of FIG. 9;

DETAILED DESCRIPTION OF THE INVENTION

Figure 1:
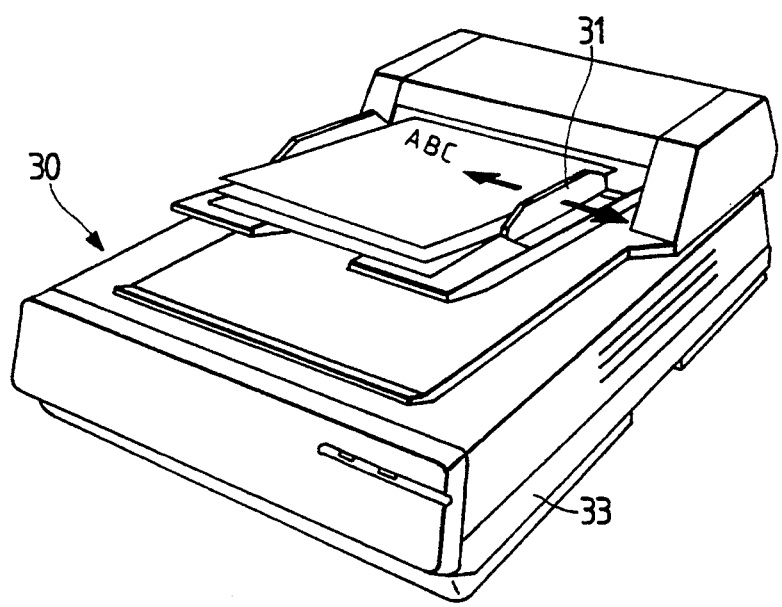
FIG. 1 is a diagrammatical perspective view of an image reading apparatus according to the present invention.
Figure 2:
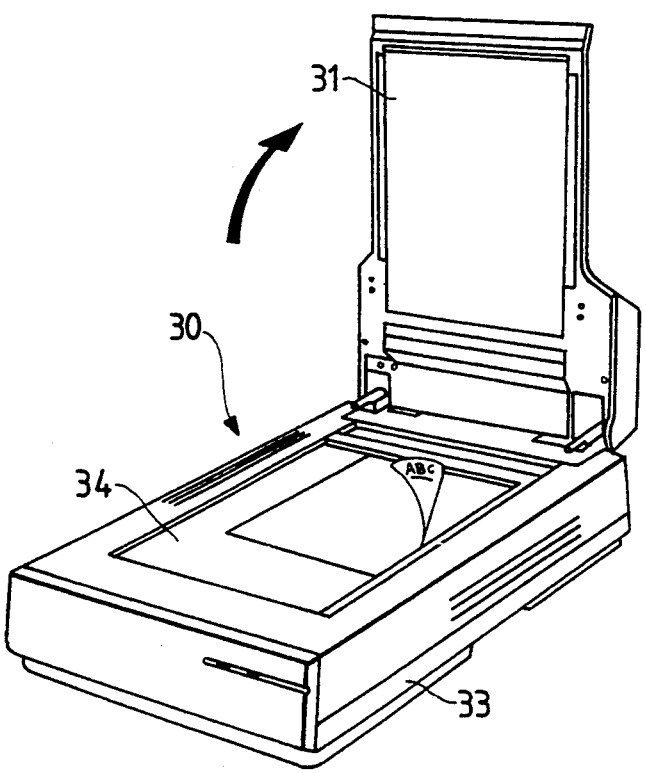
FIG. 2 is a view similar to FIG. 1, but showing the image reading apparatus used with a stationary original sheet.
Figure 3:
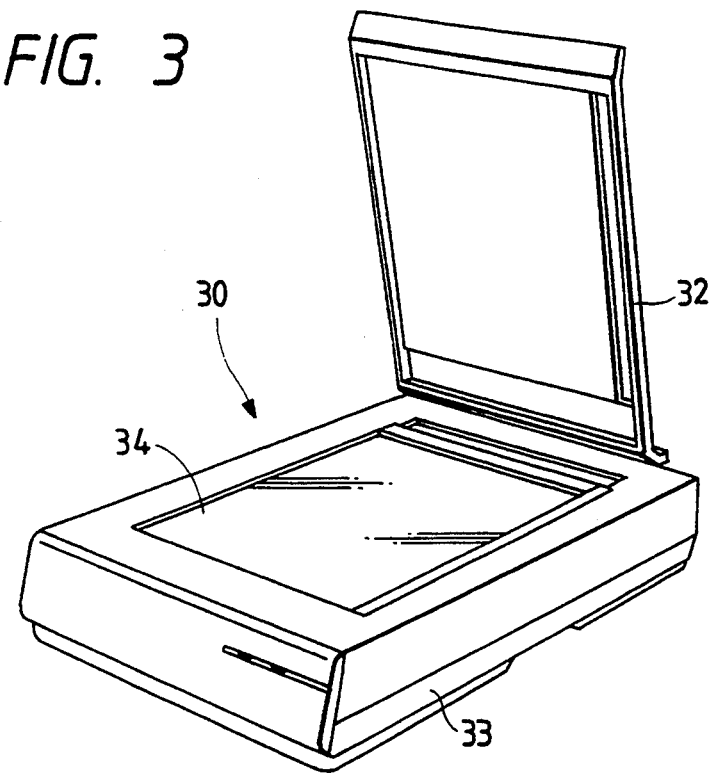
FIG. 3 is a diagrammatical perspective view of the image reading apparatus shown with its automatic document feeder replaced with an original cover.

As shown in FIG. 1, an image reading apparatus 30 according to the present invention is of the so-called "flat bed" type and includes an automatic document feeder 31. The image reading apparatus 30 thus constructed can be used as a moving original exposure type image reading apparatus which deals with a stack of original sheets such as shown in FIG. 1, and also used as a stationary original exposure type image reading apparatus which deals with a single original sheet such as shown in FIG. 2. The automatic document feeder 31 is an optional part so that it can be replaced by an original cover 32, as shown in FIG. 3.

For purposes of illustration, a description given below is directed to the image reading apparatus 30 equipped with the automatic document feeder 31, such as shown in FIGS. 1 and 2.

The image reading apparatus 30 includes a housing or case 33 and a single flat original holding plate 34 (FIG. 2) made of transparent glass (called as "flat bed glass") and attached to an upper wall of the case 33. The flat original holding glass plate 34 has an area at least equal to the area of an original sheet to be read on the image reading apparatus 30 in the stationary original exposure mode, and a width at least equal to the width of an original sheet to be read on the image reading apparatus 30 in the moving original exposure mode, as described later in greater detail.

Figure 4:
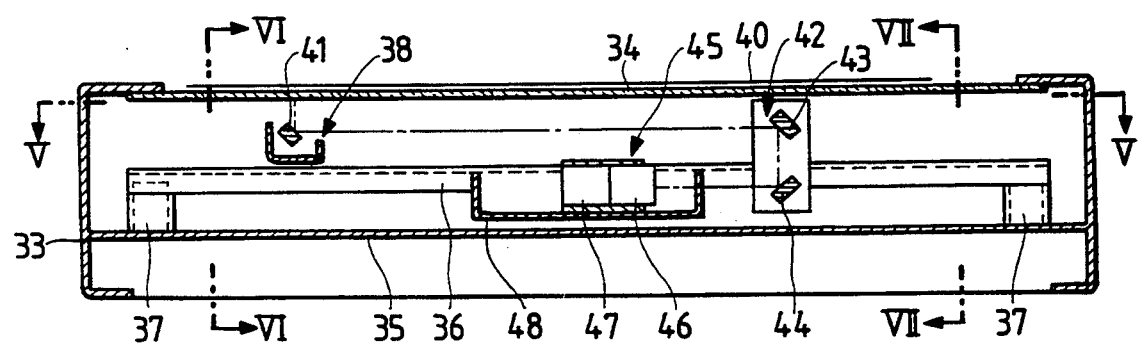
FIG. 4 is a schematic longitudinal cross-sectional view of the image reading apparatus shown in FIG. 1 with its automatic document feeder removed for clarity.
Figure 5:
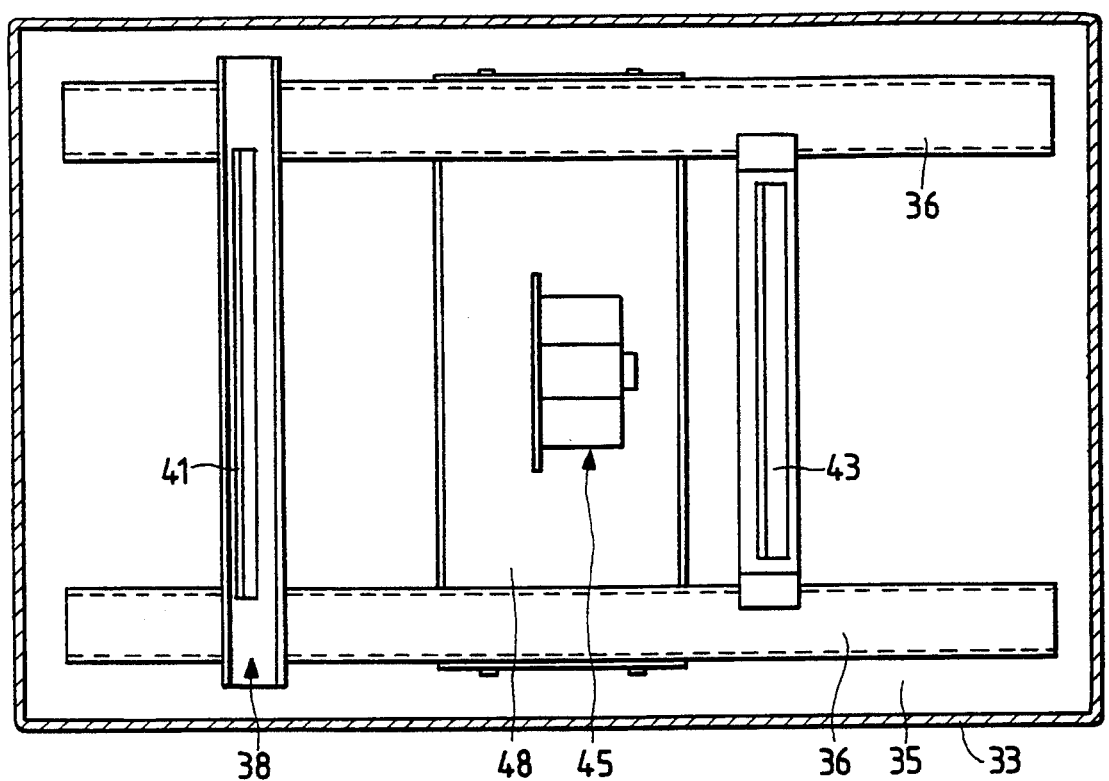
FIG. 5 is a cross-sectional view taken along line V—V of FIG. 4.

As shown in FIGS. 4 and 5, a chassis 35 is horizontally disposed in and attached to the case 33. A pair of parallel spaced elongate guide plates 36 is connected at opposite ends to the chassis 35 by means of a pair of support members 37 (FIG. 4) so that the guide plates 36 extend in a plane parallel to the original holding glass plate 34. The two guide plates 36 are made of a steel plate having a generally U-shaped cross section and jointly constitute a guide member. A first movable optical reading unit 38 is movably mounted on the guide plates 36 and extends transversely across the guide plates 36. The first movable optical reading unit includes a light source 39 (FIG. 8) for irradiating an original sheet 40 placed on the original holding glass plate 34, and a mirror 41 for changing an optical path of light reflected from a surface of the original sheet 40 so that the reflected light advances in a right-hand direction in FIG. 4 in a plane parallel to the original holding glass plate 34. A second movable optical reading unit 42 is movably mounted on the guide plates 36 and extends transversely across the guide plates 36. The second movable optical reading unit 42 includes a set of mirrors 43 and 44 by means of which the optical path of the reflected light which is changed by the first movable optical reading unit 38 is further changed in a left-hand direction in FIG. 4 in a plane parallel to the original holding glass plate 34.

Figure 6:
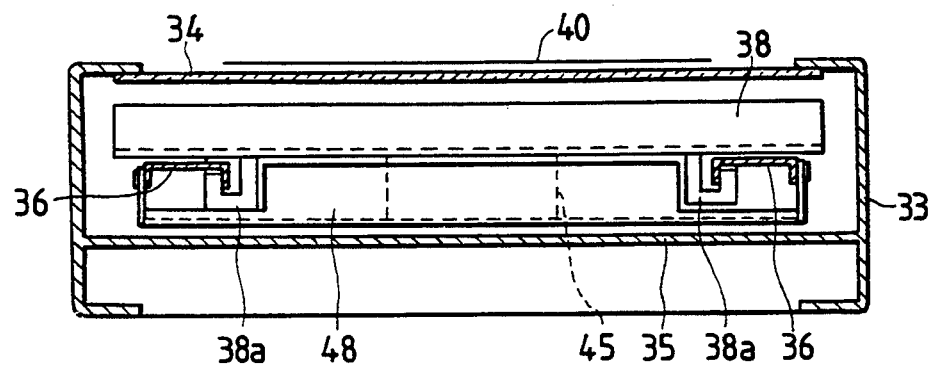
FIG. 6 is a cross-sectional view taken along line VI—VI of FIG. 4.
Figure 7:
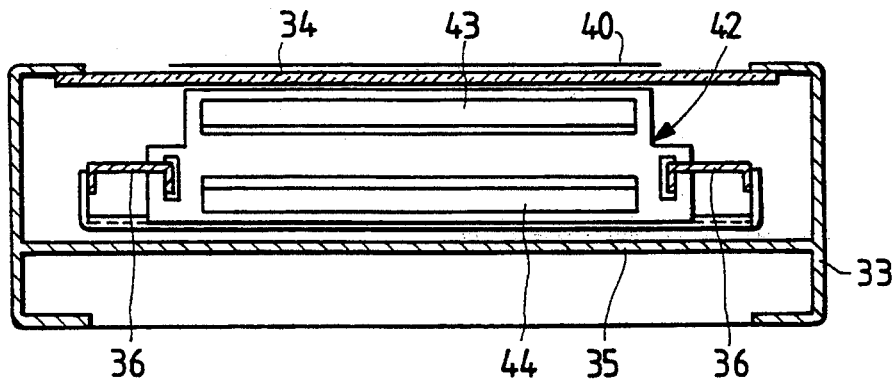
FIG. 7 is a cross-sectional view taken along line VII—VII of FIG. 4.

A photoelectric conversion unit 45 is disposed at such a position as to receive the reflected light directed from the second movable optical reading unit 42. The photoelectric conversion unit 45 includes a lens 46 and an image sensor 47 and is fixedly mounted a horizontal support plate 48 attached to the guide plates 36. In order to guarantee a smooth unobstructed movement of the first movable optical reading unit 38, opposite ends of the support plate 48 are bent upwardly and secured to outer side walls of the respective guide plates 36 by means of screws (not designated). The opposite end portions of the support plate 48 have a pair of cutout recesses 49a, 49a, respectively, for the passage therethrough of a pair of support portions 38a, 38a of the first movable optical reading unit 38, as shown in FIG. 6. The support plate 49 is preferably made of a steel plate which is resistant to deformation. Though not shown, the image reading apparatus includes a drive mechanism for moving the first and second movable optical reading units 38 and 42 in synchronism with each other in such a manner that the first movable optical reading unit 38 moves substantially over the entire length of the original holding glass plate 34 to scan the original sheet 40, while at the same time, the second movable optical reading unit 42 moves so as to keep an optical path length between the first movable optical reading unit 38 and the photoelectric conversion unit 45 always constant.

Figure 8:
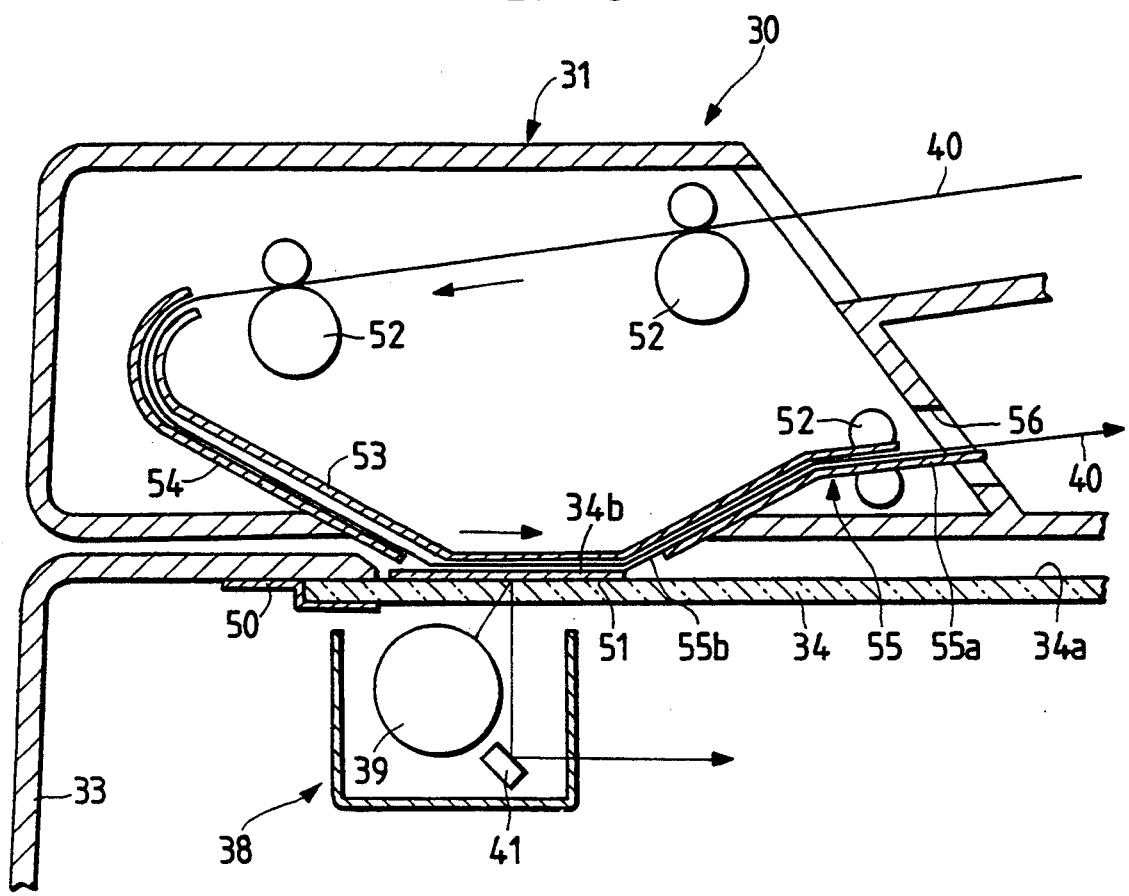
FIG. 8 is a fragmentary enlarged cross-sectional view of a portion of the image reading apparatus including an automatic document feeder.
Figure 11:
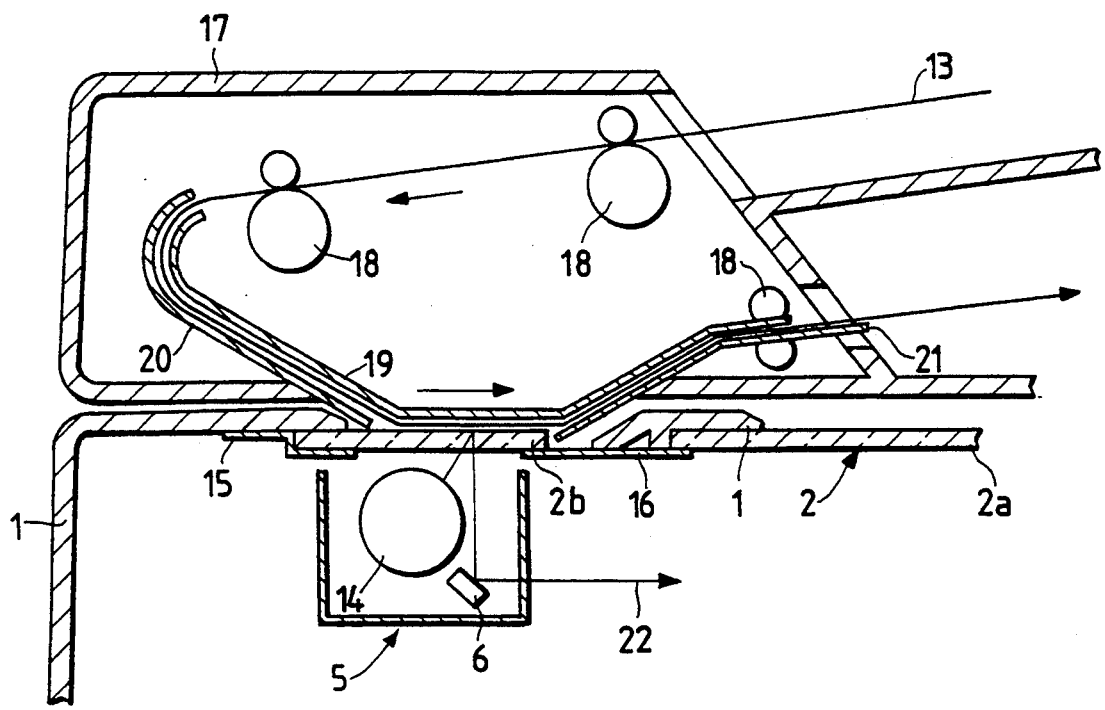
FIG. 11 is a fragmentary enlarged cross-sectional view of a portion of the conventional image reading apparatus including an automatic document feeder.
Figure 12:
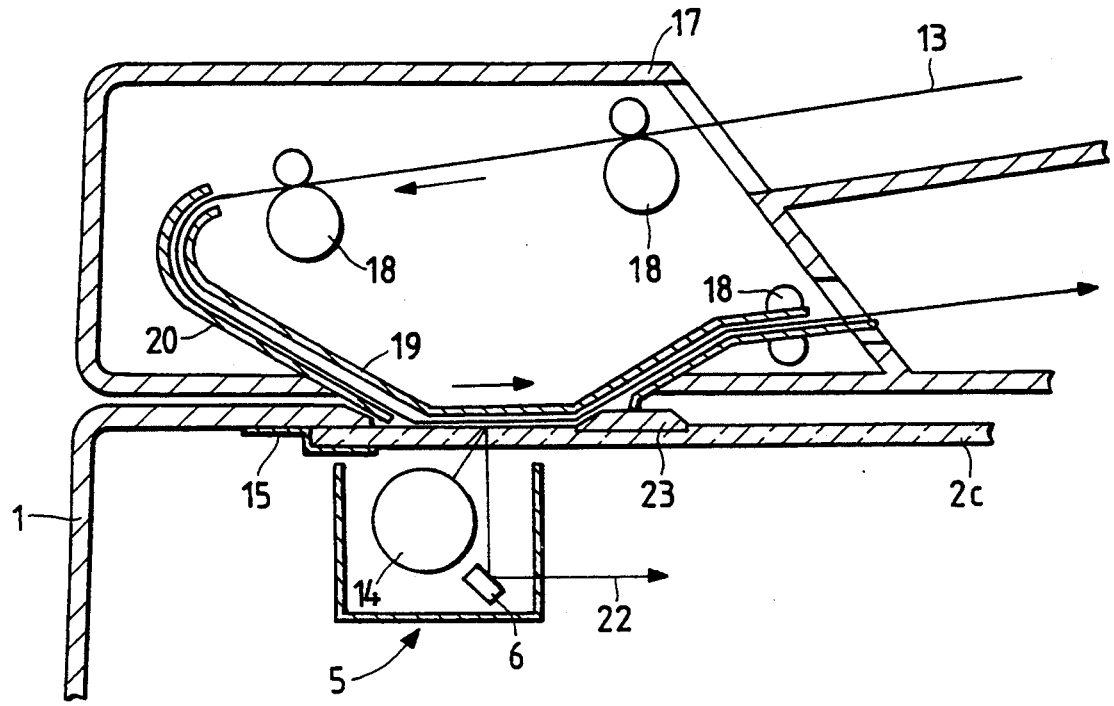
FIG. 12 is a view similar to FIG. 11, but showing another conventional image reading apparatus.

As shown in FIG. 8, the flat transparent original holding glass plate 34 is attached to the under side of an upper wall of the case 33 by means of a support member or bracket 50. Upper and lower surfaces of the original holding glass plate 34 are flat and smooth and no such a recess as shown in FIG. 12 is formed in the upper surface of the original holding glass plate 34. Accordingly, the original holding glass plate 34 can be manufactured easily at a low cost. The original holding glass plate 34 has a first original holding surface 34a which holds a stationary original sheet 40 (FIG. 4) and hence has an area at least equal to the area of the stationary original sheet 40, and a second original holding surface 34b which holds a moving original sheet 40 and hence has a width at least equal to the width of the moving original sheet 40. The second original holding surface 34b defines a moving original reading position at which the moving original sheet 40 is read by the first movable optical reading unit 38 disposed directly below the moving original reading position. The first original holding surface 34a and the second original holding surface 34b are contiguous to one another and lie in the same plane (or flush with each other). A thin flat transparent plate 51 is attached to the second original supporting surface 34b and extends over the moving original reading position for guiding therealong the moving original sheet 40 as the latter advances in a manner described later.

The automatic document feeder 31 which is pivotally connected to the case 33 is disposed above the original holding glass plate 34 for automatically feeding original sheets 40 one after another through the moving document reading position defined on the second original holding surface 34b. The automatic document feeder 31 includes an original conveyor roller system 52 composed of a plurality of mating roller pairs for feeding the original sheet 40 onto the transparent plate 51 and subsequently discharging the original sheet 40 downstream from the transparent plate 51 to the outside of the automatic document feeder 31. A pair of confronting entrance guide members 53 and 54 is disposed in the automatic document feeder 31 for guiding the original sheet 40 so that the original sheet 40 moves over and across the transparent plate 51 on the second original holding surface 34b while it is being conveyed by the original conveyor roller system 52. The automatic document feeder 31 also includes an exit guide 55 for controlling the discharge of the original sheet 40 after the original sheet 40 is read at the moving original reading position on the second original holding surface 34b.

The exit guide 55 is composed of a sloped guide body 55a extending from an outlet 56 of the automatic document feeder 31 upstream toward the transparent plate 51 and terminates short of the transparent plate 51, and a thin guide film 55b attached to an upstream end of the guide body 55a and sloping down toward the transparent plate 51. The guide film 55b has a front end (upstream end) disposed immediately adjacent to a downstream end of the transparent plate 51 and substantially held in contact with the upper surface of the original holding glass plate 34. The guide film 55b is thinner than the transparent plate 51 so that the front end of the guide film 55b is located at a level below the upper surface of the transparent plate 51. A leading end of the moving original sheet 40 is, therefore, able to move through the transparent plate 51 and then ride onto the exit guide 55 smoothly without being caught by the front end of the guide film 55b. Thus, the moving original sheet 40 is discharged smoothly and stably from the automatic document feeder 31. The transparent plate 51 is thicker than the guide film 55b but the thickness of the transparent plate 51 does not exceed the depth of field of the first movable optical reading unit 38 which takes the focus on the upper surface of the original holding glass plate 34. The transparent plate 51 may be a glass plate or a synthetic resin plate.

The image reading apparatus 25 of the foregoing construction operates as described below.

When the image reading apparatus 25 of the foregoing construction is used with a stationary original sheet, the original sheet 40 is placed on the original holding glass plate 34 and a surface of the original sheet 40 is irradiated by the light source 39. Thus, light reflected from the surface of the original sheet 40 is directed by the mirrors 41, 43 and 44 toward the photoelectric converting unit 45. Then, the first movable optical reading unit 38 moves in the right-hand direction (sub-scanning direction) in FIG. 4 over the entire length of the original sheet 40 and, in synchronism with the movement of the first movable optical reading unit 38, the second movable optical reading unit 42 moves in the left-hand direction so that the entire surface of the original sheet 40 is scanned. In this instance, it may occur that the chassis 35 is deformed due to a temperature change, for example. However, since the photoelectric conversion unit 45 is not fixed to the chassis 35 but held on the guide plates 36 together with the first and second movable optical reading units 38 and 42, the relationship regarding the optical axis between first and second movable optical reading units 38 and 42 and the photoelectric conversion unit 45 is kept always constant. Thus, an image reading operation can always be performed reliably and accurately with high temperature stability. It may also occur that the chassis 35 is twisted or otherwise deformed by an external force or pressure to such an extent that the guide plates 36 are slightly twisted. In this instance, however, the amount of change or displacement in position between the first and second movable optical reading units 38 and 42 and the photoelectric conversion unit 45 relative to the optical axis is very small and, hence, has no substantial effect on the image reading quality. Accordingly, an accurate reading of the original sheet is possible.

When the image reading apparatus 25 of the foregoing construction is used with a moving original sheet, the first movable optical reading unit 38 is disposed at a reading position directly below the moving original reading position, as shown in FIG. 8. The second movable optical reading unit 42 is also disposed in a predetermined reading position. Throughout the moving original reading operation, the first and second movable optical reading units 38 and 42 are held immovable at their respective predetermined reading positions. A leading one 40 of original sheets stacked on a document tray of the automatic document feeder 31 is supplied by the original conveyor roller system 52 toward the moving original reading position on the original holding glass plate 34. The moving original sheet 40 is guided by the entrance guide 53 and 54 and then moves over and across the transparent plate 51 in the sub-scanning direction, at which time a surface of the moving original sheet 40 is irradiated by the light source 39 of the first moving optical reading unit 38. Light reflected from the surface of the moving original sheet 40 is guided to the photoelectric conversion unit 45 (FIG. 4) via the mirrors 41, 43 and 44 so that information is read from the moving original sheet 40. The moving original sheet 40 having passed the moving original reading position is advanced further and moves onto the exit guide 55 from which the moving original sheet 40 is discharged to the outside of the automatic document feeder 31 while it is stably guided by the exit guide 55. In this instance, since the upstream end of the exit guide 55 (i.e., the front end of the guide film 55b) is disposed at a same level or below the upper surface of the transparent plate 51, the moving original sheet 40 is able to smoothly move from the transparent plate 51 to the exit guide 55 without being caught by the upstream end of the exit guide 55, and then is advanced along the exit guide 55. The moving original sheet 40 thus guided by the exit guide 55 is discharged smoothly and stably from the automatic document feeder 31.

As described above, according to the present invention, a photoelectric conversion unit is held, together with a first movable optical reading unit and a second movable optical reading unit, on a guide member instead of a chassis. Since all of the first movable optical reading unit, second movable optical reading unit and photoelectric conversion unit are held on the common guide member, the positional relationship between the photoelectric conversion unit and the guide member is held always constant even when a chassis is deformed due to an environmental change or an external force. Thus, an optical axis defined by mirrors of the first and second movable optical reading units is held always in alignment with an optical axis of the photoelectric conversion unit. This arrangement ensures that the image reading apparatus is always able to read information from the original sheet with high image quality.

In addition, the image reading apparatus of this invention includes a single flat original holding glass plate so-called "flat bed glass" used commonly for a stationary original sheet and for a moving original sheet. A transparent plate is disposed on an upper surface of the original holding glass plate so as to cover a moving original reading position of the original holding glass plate, and an exit guide have a front end (an upstream end) which is disposed adjacent to a downstream end of the transparent plate at a level below an upper surface of the transparent plate. With this arrangement, the moving original sheet is guided smoothly and stably by the exit guide without being caught by the front end of the exit guide. In addition, the original holding glass plate is devoid of a recess in its upper surface and hence can be manufactured easily at a low cost.

Obviously, various minor changes and modifications of the present invention are possible in the light of the above teaching. It is therefore to be understood that within the scope of the appended claims the invention may be practiced otherwise than as specifically described.

What is claimed is:

1. An image reading apparatus which comprises:
    a chassis having a transparent original holding plate for holding thereon an original sheet to be read;
    a light source for irradiating a surface of the original sheet held on said original holding plate;
    an elongated guide member extending in a direction parallel to a sub-scanning direction of said image reading apparatus and having opposite ends arranged along said sub-scanning direction, said elongated guide member being firmly connected to said chassis only at said opposite ends,;
    a photoelectric conversion unit arranged to achieve photoelectric conversion of the reflected light received from said second movable optical reading unit and supported only by said guide member; and
    light-path changing means supported only by said guide member for changing a path of light such that light reflected from the surface of the original sheet is directed to said photoelectric conversion unit.

2. An image reading apparatus which comprises:
    a first original holding surface having an area at least equal to an area of an original sheet to be read on said image reading apparatus;
    a second original holding surface having a width at least equal to a width of an original sheet to be read on said image reading apparatus;
    a light source for irradiating a surface of the original sheet held on said first original holding surface or said second original holding surface;
    a chassis having said first and second original holding surfaces;
    an elongated guide member extending in a direction parallel to a sub-scanning direction of said image reading apparatus and having opposite ends arranged along said sub-scanning direction and so connected to said chassis as to avoid receiving a direct effect of a torsion developed in said chassis; and,
    a single photoelectric conversion unit for achieving photoelectric conversion of light reflected from said first and second original holding surfaces.

3. An image reading apparatus according to claim 2, wherein when the original sheet is placed on said second original holding surface, said first and second original holding surfaces, and said first and second movable optical reading units are moved to their respective predetermined reading positions before reading of the original sheet begins, and said first and second movable optical reading units are held immovable at said reading positions until reading of the original sheet is completed.

4. An image reading apparatus which comprises:
    a first original holding surface having an area at least equal to an area of an original sheet to be read on said image reading apparatus;
    a second original holding surface having a width at least equal to a width of an original sheet to be read on said image reading apparatus;
    a transparent plate disposed on said second original holding surface;
    an original conveyor roller system for feeding the original sheet onto said transparent plate and subsequently discharging the original sheet downstream from said transparent plate;
    an entrance guide for guiding the original sheet so that the original sheet moves over and across said transparent plate while it is being conveyed by said original conveyor roller system; and
    an exit guide for controlling discharge of the original sheet after the original sheet is read on said image reading apparatus, said exit guide having a front end abutting a downstream end of said transparent plate at an upper surface of said transparent plate.

5. An image reading apparatus according to claim 4, wherein said first original holding surface and said second original holding surface are flush with each other and contiguous to one another, said first and second original holding surfaces being formed by one surface of a single transparent plate.

6. An image reading apparatus according to claim 4, further including an optical reading unit which takes the focus on said second original holding surface, and wherein said transparent plate disposed on said second original holding surface has a thickness not exceeding a depth of field of said optical reading unit.

7. An image reading apparatus according to claim 4, wherein said exit guide includes a guide film forming a portion of said exit guide including said front end of said exit guide, said guide film being thinner than said transparent plate.

8. An image reading apparatus which comprises:
    a chassis having a transparent original holding plate for holding thereon an original sheet to be read;
    a light source for irradiating a surface of the original sheet held on said original holding plate;
    an elongated guide member having a first end and a second end opposite to said first end, said first and second ends of said guide member being secured to said chassis;
    a photoelectric conversion unit for achieving photoelectric conversion of light reflected from the surface of the original sheet;
    light-path changing means for changing a path of light such that the light reflected from the surface of the original sheet advances to said photoelectric conversion unit; and
    said photoelectric conversion unit being secured to said guide member, said light-path changing means being movably mounted on said guide member and movable along said guide member.

* * * * *